S. A. GAGÉ.
MACHINE FOR CUTTING SLICES OF BUTTERED BREAD AND SANDWICHES.
APPLICATION FILED DEC. 29, 1909.

1,029,357.

Patented June 11, 1912.

WITNESSES
J. P. Davis

INVENTOR
Severin Auguste Gagé
BY

S. A. GAGÉ.
MACHINE FOR CUTTING SLICES OF BUTTERED BREAD AND SANDWICHES.
APPLICATION FILED DEC. 29, 1909.

1,029,357.

Patented June 11, 1912.

S. A. GAGÉ.
MACHINE FOR CUTTING SLICES OF BUTTERED BREAD AND SANDWICHES.
APPLICATION FILED DEC. 29, 1909.

1,029,357.

Patented June 11, 1912.

WITNESSES
J. P. Davis
F. B. Rollhaus

INVENTOR
Severin Auguste Gagé
BY
Munn & Co.
ATTORNEYS

S. A. GAGE.
MACHINE FOR CUTTING SLICES OF BUTTERED BREAD AND SANDWICHES.
APPLICATION FILED DEC. 29, 1909.

1,029,357.

Patented June 11, 1912.

WITNESSES

INVENTOR
Severin Auguste Gagé
BY
ATTORNEYS

UNITED STATES PATENT OFFICE.

SEVERIN AUGUSTE GAGÉ, OF PARIS, FRANCE.

MACHINE FOR CUTTING SLICES OF BUTTERED BREAD AND SANDWICHES.

1,029,357.  Specification of Letters Patent. Patented June 11, 1912.

Application filed December 29, 1909. Serial No. 535,445.

*To all whom it may concern:*

Be it known that I, SEVERIN AUGUSTE GAGÉ, a citizen of the French Republic, and a resident of 13 Rue de Presbourg, in the city of Paris, Republic of France, merchant, have invented Improvements in Machines for the Cutting of Slices of Buttered Bread and Sandwiches, of which the following is a full, clear, and exact description.

This invention relates to a machine for the production either of slices of buttered bread or of sandwiches, the machine being so constructed that the two pieces of bread shall be of the same thickness, shall both be buttered and the slices of buttered bread or sandwiches, as the case may be, delivered in a continuous manner.

The machine is characterized essentially by: 1°, means for advancing the bread, butter and meat constituting the sandwich and the slices of buttered bread; 2°, means for adjusting the advance; 3°, an arrangement of controlling the bread and meat cutting knives; 4°, means for controlling the table which delivers the elements constituting the sandwich or the slices of bread and butter.

The invention is illustrated in the accompanying drawings wherein—

Figure 1 shows the machine in elevation, and Fig. 2 a plan thereof, drawn to a larger scale.

As will be seen in the drawings, the machine is provided with three containers $a$, $a^1$, $a^2$, two of which are completely open at both ends and respectively contain the different substances which have to be superposed in thin slices, the container $a$ serving for bread, $a^1$ for butter, and $a^2$ for meat. The containers $a$ and $a^1$ are of the same dimensions while the container $a^2$, which is of the same height as the others, is only of one-half their width. These containers are mounted in hollows in a carrier $b$ which is counterweighted and capable of being swung around an arbor $b^1$ carried by the frame $c$ of the machine in such manner as to enable the internal parts of the machine to be inspected and cleaned. Beneath the carrier $b$ there is a rotary table $d$ provided with four apertures of equal dimensions, each of which is provided with a vertically displaceable false bottom $e$, $e^1$, $e^2$ or $e^3$. Three of these bottoms, respectively placed beneath the receptacles $a$, $a^1$ and $a^2$, serve to support the substance at the required level during the production of the buttered slices or sandwiches, while the fourth bottom which does not engage beneath the carrier $b$ serves to raise the buttered slices or the sandwiches and bring them to the level with the upper surface of the table $d$.

The slices of bread and meat are cut by the knives $f$ and $f^1$ which have undulatory cutting edges. These knives are mounted beneath the containers $a$ and $a^2$ and receive, simultaneously, a rectilinear to-and-fro-movement and an angular displacement of approximately 40° by mechanism hereinafter described.

Figure 4:
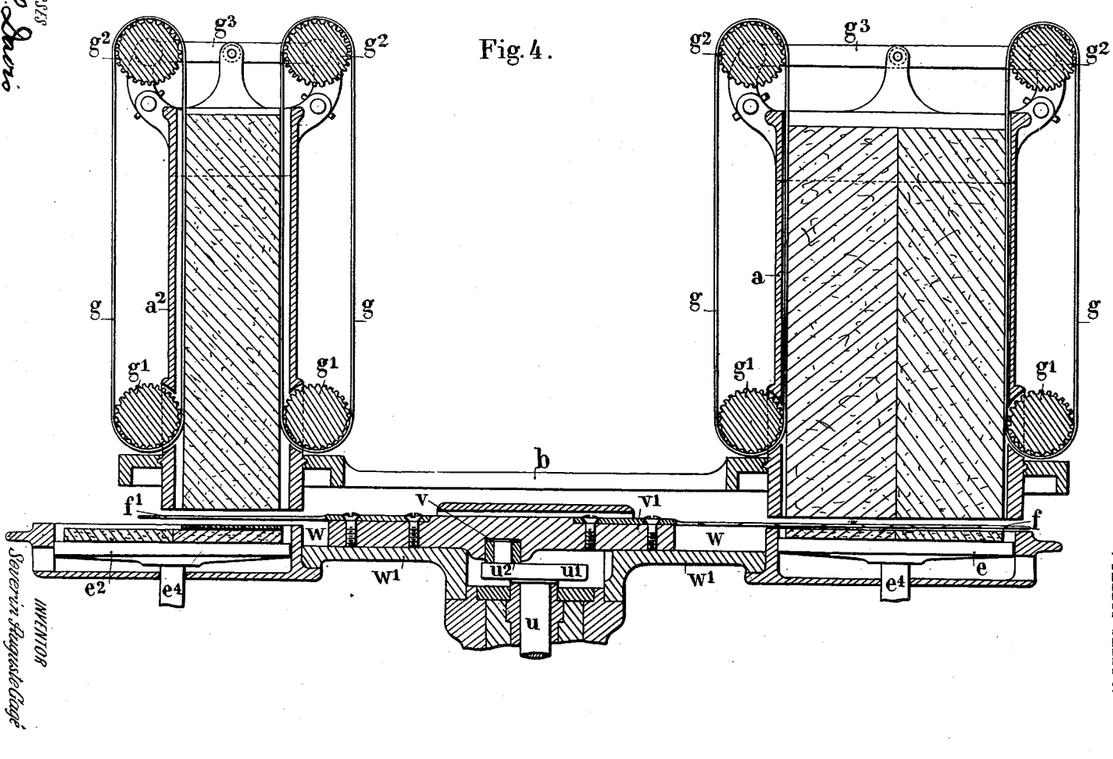

The advance of the bread and the meat is effected by the following means. Each of the containers $a$ and $a^1$ is provided on two of its opposite sides with a conveyer constituted by an endless band $g$ distended around rollers $g^1$ and $g^2$. The lower rollers $g^1$ are carried by the container and project slightly within the container through openings provided for this purpose (see Fig. 4) and the two upper rollers $g^2$ are carried by a cross member $g^3$ adjustably secured to the container so as to permit of the regulation of the tension of the endless bands. By this arrangement one member of the endless band is caused to travel against the wall of the container, while the other member travels externally of the container. These conveyers $g$ receive, at regular intervals, a movement of translation whose amplitude may be regulated. To this end each of the lower rollers $g^1$ is furnished with a ratchet wheel $g^4$ actuated by a spring-pressed pawl $h$. The two pawls $h$ are mounted on a sleeve $h^1$ secured to a tube $h^2$ slidably mounted upon a central rod $i$ attached to the carrier $b$. This rod is hollow at its upper end and is provided with a slot $i^1$ wherein a cross pin $j$ carried by the tube $h^2$ may slide.

$j^1$ is a return spring mounted within the rod $i$ so as to bear against the cross pin $j$ and tend to constantly press the tube $h^2$ upwardly, in which movement it carries with it the two pawls $h$.

$i^2$ is an adjusting screw received in the threaded upper extremity of the rod $i$ and serving to limit the upward movement of the pin $j$.

The descending movement of the tube $h^2$ and of the pawls $h$, and consequently the driving of the rollers $g^1$ by the latter is controlled in the following manner.

Upon the carrier $b$ are mounted two levers $k$ and $k^1$ capable of oscillating upon two trunnions $k^2$ and $k^3$ so arranged that the angular displacement of these levers is proportional to the thickness of the slices to be cut. The two levers $k$ and $k^1$ receive, simultaneously, angular movement by means of a vertical rod $l$ hinged at its upper extremity to these levers. The rod $l$ is jointed at its lower part to an arm $l^1$ on a horizontal shaft $l^2$ provided at one end with an arm $l^3$ carrying a roller $l^4$ maintained in contact with a cam $m$. This cam is integral with a bevel gear wheel $m^1$ meshing with a bevel pinion $n$ keyed upon the driving shaft $o$. The two free extremities of the levers $k$ and $k^1$ are adapted to act upon two lugs $p$ and $p^1$ carried respectively by the tubes $h^2$ forming part of the mechanism for delivering the bread and meat contained in the containers $a$ and $a^2$.

The spreading of the butter placed in the container $a^1$ is effected by means of a piston $g$ whose downward motion is regulated in the following manner: The piston rod $g^1$ of the piston $g$ is provided with rack teeth $g^2$ and passes through a horizontal crossbar $r$ secured at its two extremities by the pillars $r^1$. The rack $g^2$ is engaged by a pinion $s$ upon whose axis is fixed a ratchet wheel $s^1$ actuated by a pawl $s^2$ mounted upon a lever $s^3$ rotatably mounted upon the axis of the pinion $s$. This lever is actuated by means of a finger $t$ hinged upon one of the pillars $r^1$ and operated by a connecting rod $t^1$ hinged to the lever $k^1$ controlling the advance of the meat. In order to permit the adjustment of the downward motion of the piston $g^1$ and consequently the thickness of the layer of butter, the ratchet wheel $s^1$ is also in engagement with a second pawl $s^4$ pivotally mounted on the lever $s^3$ and carrying a star wheel having three arms $s^5$ of different lengths any one of which is adapted to come into contact with the extremity of the lever $s^3$. The length of the particular arm on the star wheel $s^5$ which for the time being is in contact with the lever, determines the height to which the end of said lever is raised, with the result that the finger $t$ acting upon the lever displaces to a variable extent the pawl $s^2$ so that the ratchet wheel $s^1$ is advanced one, two or three teeth. The piston $g$ forces the butter against a perforated plate $g^3$ which distributes the butter in such manner as to leave a small uncovered marginal portion on both sides of the slice of bread and thus avoids the liability of the butter projecting beyond the edges.

The movements of the bread and meat cutters $f$ and $f^1$ are effected in the following manner: At the center of the machine there is a vertical shaft $u$ carrying at its upper extremity a crank disk $u^1$ whose crank is constituted by a cross head block $u^2$ which engages in a transverse groove $v$ in a block $v^1$ to which the knives $f$ and $f^1$ are fixed. This block $v^1$, which is placed diametrically across the table $d$ and transversely of the containers $a$ and $a^2$ containing the bread and meat, receives an alternating to-and-fro movement. The block $v^1$ engages with and is adapted to slide in a groove $w$ in the circular table $w^1$ which is arranged at the center of, and at the same level as, the table $d$. This table $w^1$ receives an alternating angular movement by means of the following devices. Beneath the table $w^1$ there is fixed a toothed sector $w^2$ furnished with a sleeve adapted to turn around the central sleeve $c^1$ of the frame $c$. This sector $w^2$ gears with a sector $x$ fixed to a segmental member $x^1$ which is capable of oscillating around an arbor $x^2$ carried by the frame $c$.

Figure 5:
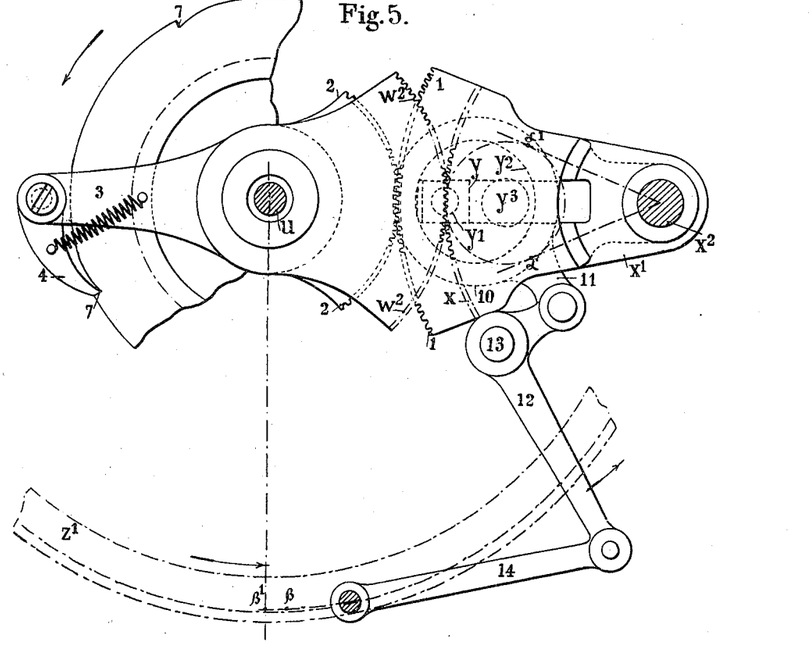
Fig. 5 is a horizontal section on line C—C of Fig. 3.
Figure 6:
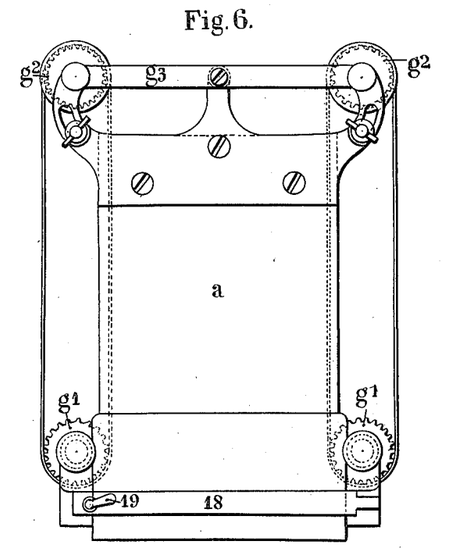
Fig. 6 shows in elevation, the container for the bread separately.
Figure 7:
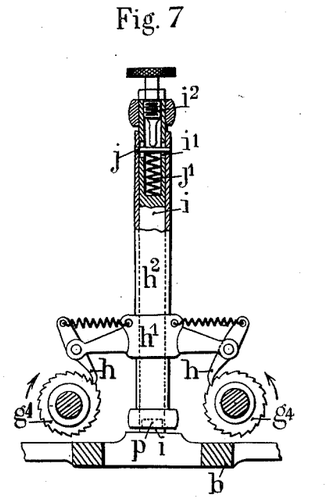
Fig. 7 shows, partly in elevation, and partly in section, the means for delivering the bread, meat or other alimentary material.
Figure 8:
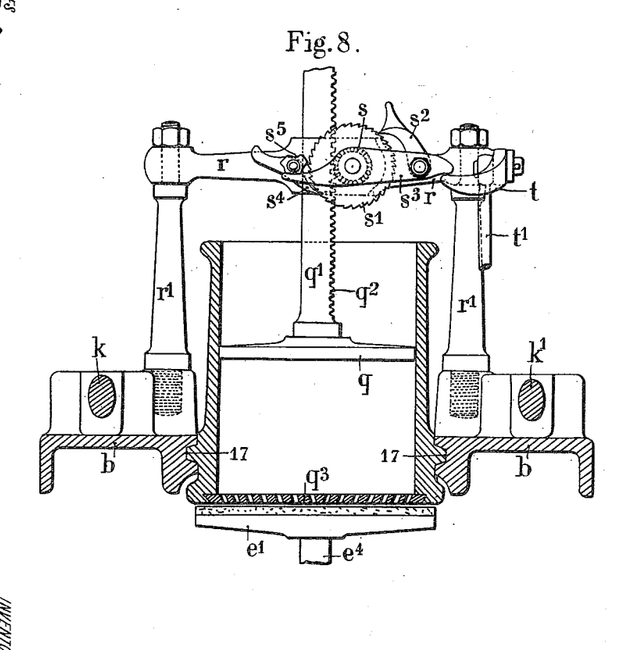
Fig. 8 is a vertical section of the butter container demonstrating the means whereby the butter is spread on the bread.
Figure 9:
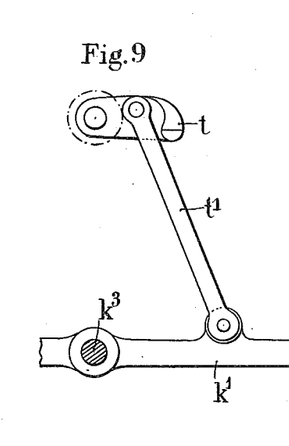
Fig. 9 is a side view of the container showing the method for controlling the means for spreading the butter.

$x^3$ is a slot in the member $x^1$ in which slides a block $y$ mounted on a wrist pin $y^1$ of a crank plate $y^2$ which is keyed to the upper end of the shaft $y^3$. The shaft is provided at its lower extremity with a bevel wheel $m^1$ with which a toothed pinion $n$ keyed upon the driving shaft $o$ engages. When the crank pin $y^1$ receives continuous circulatory movement, it imparts to the member $x^1$ a reciprocating and quick return motion. In effect during the movement of the block $y$ from the point $\alpha$ to the point $\alpha^1$ (Fig. 5) the speed of displacement of the member $x^1$ is at its maximum, so as to permit of the return movement of the knives $f$ and $f^1$ during the period of change of operations, that is to say, during the movement of the plate $d$ which at the same time brings the various elements of the buttered bread or sandwiches beneath the containers $a^1$ and $a^2$ in succession. On the other hand the movement of the member $x^1$ is slower from the point $\alpha^1$ to the point $\alpha$ so as to permit of the cutting operation. Thus, as has been above stated, the materials are carried in depressions in the rotary table $d$ on the false bottoms $e$, $e^1$, $e^2$ and $e^3$. These latter are maintained at the required height by means of a circular groove $z$ constituting a cam provided in a metal ring $z^1$ carried on the frame $c$. To this end each of the bottoms $e, e^1, e^2$ and $e^3$ is provided with a stem $e^4$ fitted in a slide $d^1$ formed in the table $d$ and carrying a lateral friction roller $e^5$ which engages in the groove $z$. The profile of the latter is such that the three bottoms which receive the elements of the buttered bread and sandwiches are lowered after the deposit thereon of each slice of bread, butter and meat to a quantity equal to that of the thickness of the succeeding slice which is to be applied upon the preceding slices, while the fourth bottom is raised to deliver these materials to the level of the surface of the table $d$. After the deposit of each slice of material the rotary table $d$ receives an angular displacement to the extent of a quarter of a revolution. This intermittent rotary movement is brought about by the following mechanism: The oscillating member $x^1$ carries a toothed sector 1 which gears with another toothed sector 2 capable of turning around the central sleeve $c^1$ of the frame $c$. This sector 2 carries an arm 3 on the extremity of which is mounted a pawl 4 actuating a crown wheel 5 fixed beneath the plate 6 carrying the table $d$. This crown wheel 5 is circumferentially provided with four notches 7 which correspond each to one quarter of a revolution and with which the pawl 4 successively engages. The plate 6 is furnished with four notches 8 into which a locking bolt 9 can enter and which serves to immobilize the plate during the cutting operation. At each displacement of the member $x^1$ controlled by the crank disk $y^2$ the arm 3 of the sector 2 acts on the pawl 4 which, taking an abutment in one of the notches 7 of the crown wheel 5, advances the latter and consequently the table $d$ to which it is attached one quarter of a revolution.

The butter deposited on the slices of bread in the manner above indicated is spread as follows: Around the crank disk $y^2$ which actuates the knives $f f^1$ and the rotary table $d$, there is arranged a strap 10 provided with an eccentric head 11 to which is secured a bell-crank lever 12 pivoted on the arbor 13. To the lower part of this lever a connecting rod 14 is jointed, said rod being mounted on the ring $z^1$ in which is provided the groove $z$ constituting a cam. The movement of these members is not simultaneous with the other movements of the machine so as to permit the ring $z^1$ to be slightly retracted at each displacement of the table $d$. This slight rearward displacement (which takes place between the point $\beta$ and $\beta^1$ Fig. 5) has for its object to permit the friction roller of the plate placed beneath the butter container $a^1$ to rise on a small boss presented in the groove $z$ in order to again raise the said plate and thus permit the spreading of the layer of butter upon the slices of bread. The butter is forced through the openings in the bottom of the butter container and when the bread on the plate is brought into contact with the butter issuing from the openings, the pressure of the bread against the container's bottom forces the butter out on to the upper face of the bread.

The carrier $b$ which, as above seen, can swing around the arbor $b^1$ when it is desired to inspect and clean the interior of the machine, is immobilized in its normal position by means of two bolts 15 carried by the frame $c$ and which engage notches in lugs 16 projecting from the periphery of the carrier $b$. In order to permit of the proper cleaning of the containers $a$ and $a^2$ and the filling of the butter container $a^1$, said containers are capable of being moved in slideways 17 suitably arranged. These containers are maintained in the required position by means of straps 18 provided with locking devices 19. On the other hand, in order to prevent crumbs of bread or portions of meat produced by the passage of the knives $f f^1$ finding their way into the members on the machine, the central plate $w^1$ is provided with two hollows $w^3$ respectively disposed at the extremities of the block V and intended to receive these crumbs, etc.

The driving shaft $o$ which actuates the various members of the machine may be driven by any suitable means, i. e. by an ordinary motor, electric motor, or by means of a pedal, etc.

Figure 1:
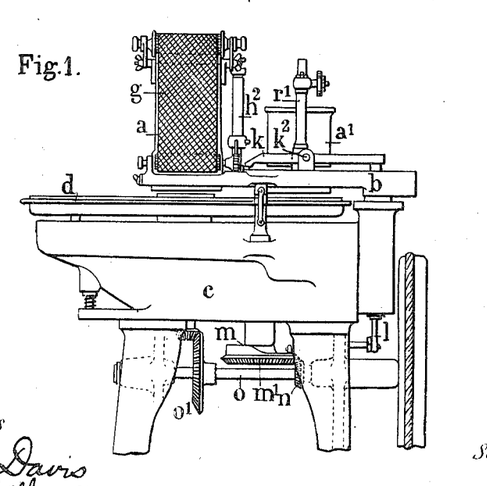
Figure 2:
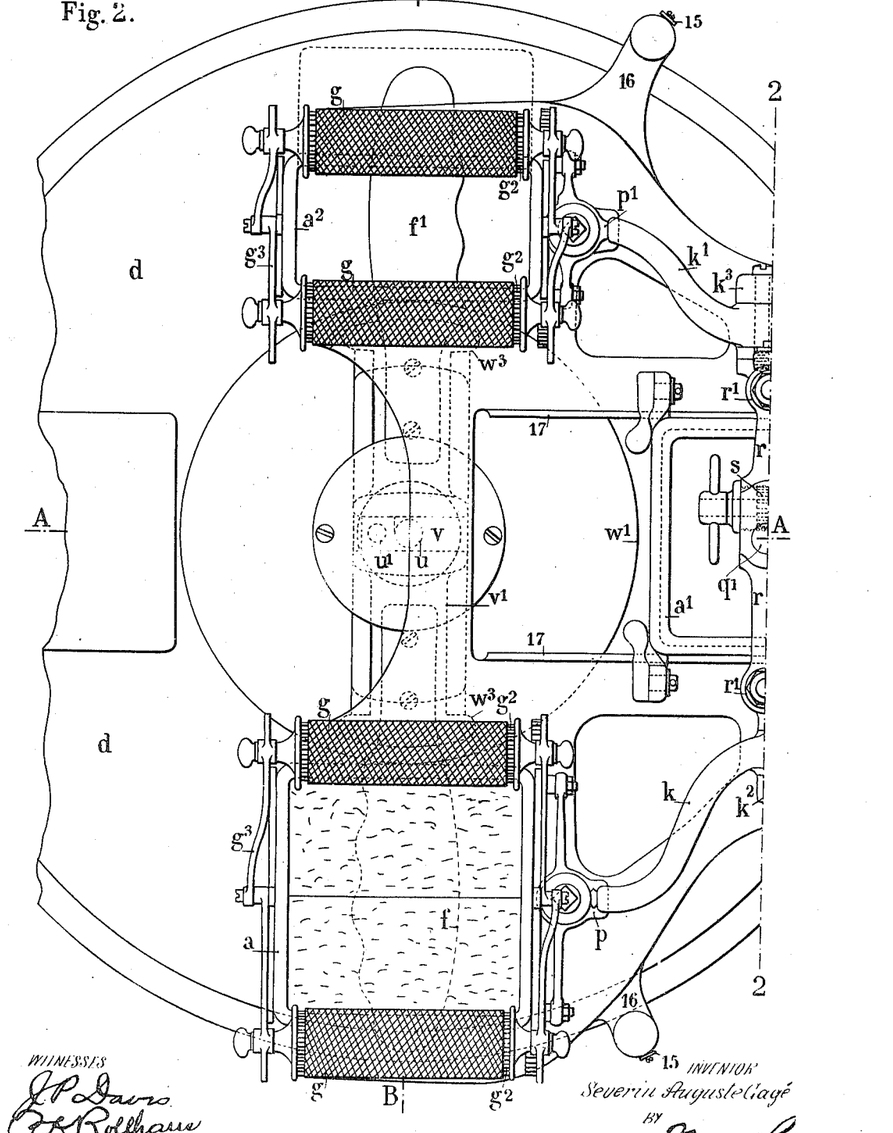
Figures 2, 3:
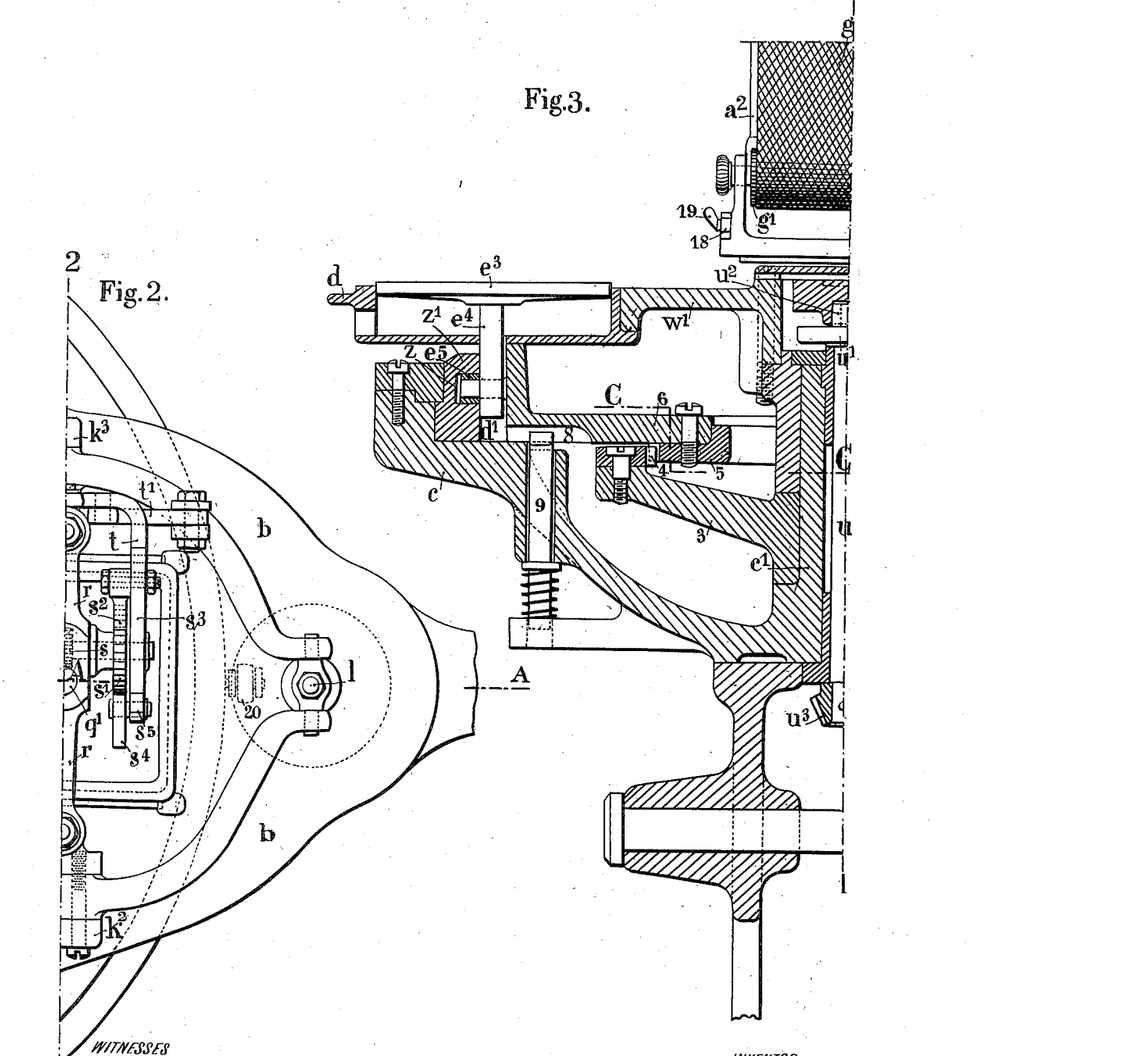
Figure 3:
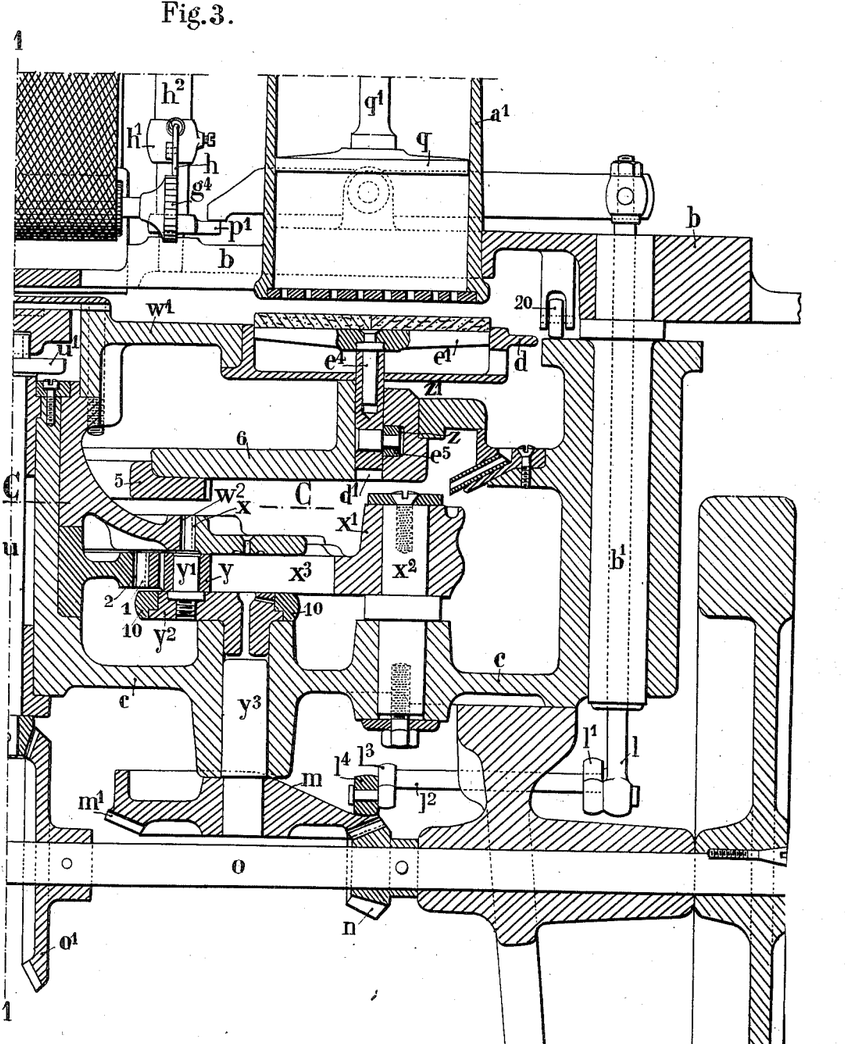
Fig. 3 a vertical section on the line A—A, and Fig. 4 a similar section on line B—B of Fig. 2.

The operation of the machine thus arranged is as follows: The container $a$ contains a loaf of bread, the container $a^1$ butter, and the container $a^2$ a piece of meat. The loaf of bread is divided into two portions previous to its introduction into the machine by a vertical cut across the transverse axis of the machine, as will be seen in Fig. 2, in such manner that the knife $f$ at each operation cuts two slices of bread placed side by side. The machine having been started the production of buttered slices of bread and sandwiches is effected according to the following operations: The lower rollers $g^1$ of the bread container $a$ receive angular displacement and communicate a movement of translation to the two endless bands $g$. The loaf of bread frictionally engaged between these bands thus receives an advance movement corresponding to the thickness of the slice to be cut. Owing to this motion the lower part of the loaf descends into the corresponding depression in the rotary table $d$ and rests upon the movable bottom $e$ which has been lowered, by the cam groove $z$ below the level of the table $d$ to a height corresponding to the thickness of the slice. The knife $f$ to which is imparted reciprocating motion also receives angular displacement by means of the above described members in the direction of the arrow shown in Fig. 3, then cuts a slice of bread, which as above stated, is divided into two portions of equal dimensions. As soon as these slices of bread are cut the false bottom $e$ is lowered and the table $d$ receives angular displacement of a quarter of a revolution which brings the slices of bread below the butter container $a^1$. The butter is thereupon extruded by the piston $q$ slidably mounted within the container $a^1$ and presses it against the perforated plate $q^3$ through the openings therein and is finally spread over the central part of each slice of bread, as previously described. The table $d$ then receives a second angular displacement of a quarter of a revolution. When starting the ring $z^1$ on which the cam groove $z$ is disposed, receives a slight, rearward motion from the members 10, 11, 12 and 14, said motion permitting the rising of the carrier $e^1$ and the spreading of a layer of butter on the slices of bread. At the end of this second angular displacement of the table $d$ the slices of bread thus buttered are brought below the meat container $a^2$. This container whose size is only one-half of that of the containers $a$ and $a^1$, is so arranged as to be above one of the slices of bread, the block of meat being driven on by the two endless bands $g$ is applied on the slice of buttered bread carried by the movable bottom which has been lowered beneath the level of the table to an extent corresponding to the thickness of the slice of meat to be cut, which is then cut off by the knife $f^1$ which operates in the same manner as the knife $f$. The table $d$ then receives a third angular displacement of one quarter of a revolution which brings the hollowed portion containing the sandwich into the transverse axis of the butter receptacle $a^1$, that is to say, into a position in which it is not covered by the carrier $b$ (Fig. 2). This third displacement of the table $d$ having for effect to cause the movable plate $e$ to rise to the level of the table $d$, the attendant then taking the slice of buttered bread on which no meat has been placed, by means of a fork and reverses it on to the other slice of bread. The sandwich is then completed and is taken off by means of a fork or by means of a slice so as to transfer it to a receptacle placed outside the machine. The same operations are repeated successively and owing to the disposition of the parts of the machine, there is always at the same time three sandwiches in course of production and one ready to be taken away.

By reason of the arrangement for advancing the bread and meat, the containers $a$ and $a^2$ may be recharged without stopping the delivery; moreover, the advance of the bread and the meat is always effected in a regular manner without any possibility of jamming.

It is to be understood that the container $a^2$ may be used to contain matters other than meat, for example paste, fish, cheese, etc. according to the kind of sandwiches to be made.

Figure 10:
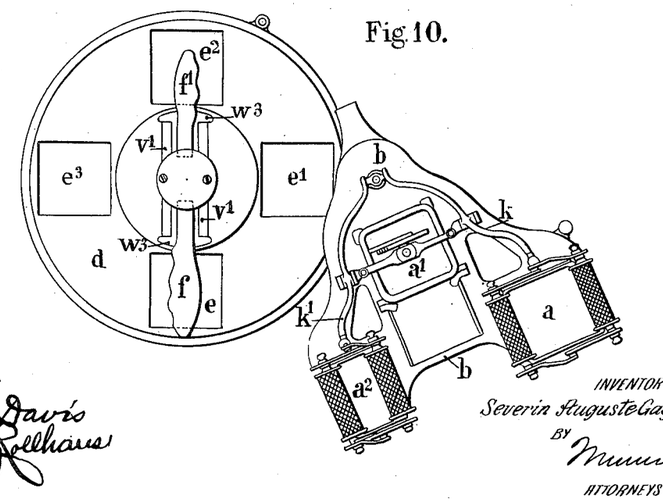
Fig. 10 shows a plan of the machine, the parts being in a position to enable the interior of the machine to be inspected and cleaned.

When it is desired to inspect and clean the interior of the machine, the bolts 15 are loosened so as to free the carrier $b$ and the latter is swung around the arbor $b^1$ so as to bring the carrier to the position shown in Fig. 10. The knives $f\ f^1$, the hollows in the table $d$, as well as the bottoms which are received in the latter, are then uncovered and it is therefore possible to inspect and clean these without difficulty. In order to sustain the carrier $b$ during this displacement it is provided on its inner face with a friction roller 20 adapted to roll upon the upper part of the sleeve of the arbor $b^1$.

Claims:

1. In a machine of the character specified, a rotary table, a plurality of containers on the table, one of said containers being adapted for containing a loaf of bread, another for containing meat, and another for containing butter, said last named container having a perforated bottom, a plunger movable in the container for forcing the butter through the perforated bottom, means in connection with each of the other containers for feeding the bread and meat downwardly, means for cutting off a slice of bread and a slice of meat, said table having an opening for receiving the cut bread, a movable bottom in the opening, and means for moving the table to bring the bottom in succession beneath the container for the bread, beneath the container for the butter, and beneath the container for the meat.

2. A device of the class described, comprising a rotating table having an opening, a movable bottom in the opening, a plurality of containers for containing the material from which the sandwiches are to be formed, means for advancing the material in the containers, means for intermittently moving the table to bring the movable bottom in succession beneath the containers, means for depressing the said bottom when beneath the said container for receiving the slices of bread, means for severing a slice of bread when the bottom is below the container, means for depositing butter on the bread when the bottom is beneath the butter container, means for severing a slice of meat when the movable bottom is beneath the meat container, and means for lifting the said bottom when the table is moved to bring the bottom from beneath the meat container.

3. In a device of the character specified, a plurality of knives mounted to swing in a horizontal plane, means for simultaneously swinging the said knives and moving them longitudinally, said means comprising a block to which the knives are connected, a shaft, a crank disk on the end of the shaft, said block having an opening for receiving the crank of the disk, and a guide for constraining said block to move longitudinally.

4. In a device of the character specified, a plurality of knives mounted to swing in a horizontal plane, a support to which the knives are connected, the said knives being oppositely arranged, and means for simultaneously swinging the knives and moving them longitudinally, said means comprising a crank disk, a support having an opening for receiving the disk and a guide for constraining the support to move longitudinally with respect to the knives.

5. In a device of the character specified, a plurality of knives mounted to swing in a horizontal plane, a support to which the knives are connected, the said knives being oppositely arranged, and means for simultaneously swinging the knives and moving them longitudinally.

6. In a machine of the character specified, a rotating table, and means for intermittently moving the table, said means comprising a toothed sector, an arm connected with the sector, a pawl on the end of the arm, and a ratchet ring connected with the table, with which the pawl coöperates.

7. In a machine of the character specified, a table having an opening, a bottom movable in the opening, said bottom being adapted to receive the material, a rod connected with the bottom, a roller on the bottom of the rod, and a cam for engagement by the roller.

8. In a machine of the character specified, a container for butter, containers for bread and for meat, means for intermittently advancing the material in the last-named containers, means for slicing the bread and the meat, means for moving the sliced bread beneath the butter container, and means for forcing butter from the container on to the bread.

The foregoing specification of my improvements in machines for the cutting of slices of buttered bread and sandwiches signed by me this seventeenth day of December 1909.

SEVERIN AUGUSTE GAGÉ.

Witnesses:
    DEAN B. MASON,
    R. EHIRIOT.